US 10,839,418 B1

United States Patent
Aragonda et al.

(10) Patent No.: US 10,839,418 B1
(45) Date of Patent: Nov. 17, 2020

(54) PREDICTING PERFORMANCE OF CONTENT ITEM CAMPAIGNS

(71) Applicant: Facebook, Inc., Menlo Park, CA (US)

(72) Inventors: Prathyusha Aragonda, Mountain View, CA (US); Sumeet Kumar, Belmont, CA (US); Spencer Bingham Powell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 46 days.

(21) Appl. No.: 16/200,606

(22) Filed: Nov. 26, 2018

(51) Int. Cl.
*G06Q 30/00* (2012.01)
*G06Q 30/02* (2012.01)

(52) U.S. Cl.
CPC ..... *G06Q 30/0243* (2013.01); *G06Q 30/0249* (2013.01)

(58) Field of Classification Search
None
See application file for complete search history.

(56) References Cited

U.S. PATENT DOCUMENTS

| 2013/0282477 A1* | 10/2013 | Gould | G06Q 30/0243 705/14.42 |
| 2018/0315082 A1* | 11/2018 | Gao | G06O 30/0254 |

* cited by examiner

*Primary Examiner* — Meredith A Long
(74) *Attorney, Agent, or Firm* — Fenwick & West LLP

(57) ABSTRACT

An online system predicts a performance of a content item campaign based on a set of received target parameters from a content item publisher and compares the predicted performance of the content item campaign to predicted performances of comparison campaigns. The comparison campaigns are selected by performing a plurality of simulations on prior content item campaigns to estimate campaign presentation results for each prior content item campaign if presented to users with the sets of test campaign parameters. After generating histograms based on the estimated results, the online system selects prior content item campaigns for the set of comparison campaigns based on changes in histogram positions of the prior content item campaigns. The online system generates a set of estimated campaign presentation results for the content item campaign and the set of comparison campaigns for comparison.

20 Claims, 4 Drawing Sheets

| Campaign | P1 | P2 | P3 | P4 |
|---|---|---|---|---|
| C1 | Score: 20<br>Bin: 8 | Score: 30<br>Bin: 7 | Score: 90<br>Bin: 1 | Score: 85<br>Bin: 2 |
| C2 | Score: 50<br>Bin: 5 | Score: 53<br>Bin: 5 | Score: 52<br>Bin: 5 | Score: 60<br>Bin: 4 |
| C3 | Score: 25<br>Bin: 8 | Score: 40<br>Bin: 6 | Score: 70<br>Bin: 3 | Score: 60<br>Bin: 4 |
| C4 | Score: 95<br>Bin: 1 | Score: 90<br>Bin: 1 | Score: 90<br>Bin: 1 | Score: 92<br>Bin: 1 |
| C5 | Score: 10<br>Bin: 10 | Score: 12<br>Bin: 9 | Score: 14<br>Bin: 9 | Score: 12<br>Bin: 9 |
| C6 | Score: 30<br>Bin: 7 | Score: 50<br>Bin: 5 | Score: 70<br>Bin: 3 | Score: 20<br>Bin: 8 |

FIG. 3

```
┌─────────────────────────────────────────────────────────────────┐
│ Identify a set of prior content item campaigns and a plurality  │
│ of sets of test campaign parameters                             │
│ 505                                                             │
└─────────────────────────────────────────────────────────────────┘
                                │
                                ▼
┌─────────────────────────────────────────────────────────────────┐
│ For each set of test campaign parameters, estimate campaign     │
│ presentation results for each prior content item campaign using │
│ the set of test campaign parameters.                            │
│ 510                                                             │
└─────────────────────────────────────────────────────────────────┘
                                │
                                ▼
┌─────────────────────────────────────────────────────────────────┐
│ Identify a score of the prior content item campaigns according  │
│ to the estimated campaign presentation results.                 │
│ 515                                                             │
└─────────────────────────────────────────────────────────────────┘
                                │
                                ▼
┌─────────────────────────────────────────────────────────────────┐
│ Generate a histogram of the prior content item campaigns that   │
│ assigns a bin to a prior content item campaign based on the     │
│ score.                                                          │
│ 520                                                             │
└─────────────────────────────────────────────────────────────────┘
                                │
                                ▼
┌─────────────────────────────────────────────────────────────────┐
│ Identify a change in histogram position for each prior content  │
│ item campaign across the histograms.                            │
│ 525                                                             │
└─────────────────────────────────────────────────────────────────┘
                                │
                                ▼
┌─────────────────────────────────────────────────────────────────┐
│ Select a set of comparison campaigns based on the change in     │
│ histogram position for the prior content campaigns.             │
│ 530                                                             │
└─────────────────────────────────────────────────────────────────┘
                                │
                                ▼
┌─────────────────────────────────────────────────────────────────┐
│ Receive a set of target parameters for a content item campaign  │
│ from an entity.                                                 │
│ 535                                                             │
└─────────────────────────────────────────────────────────────────┘
                                │
                                ▼
┌─────────────────────────────────────────────────────────────────┐
│ Generate a set of estimated campaign presentation results for   │
│ the content item campaign presentation results of the set of    │
│ comparison campaigns if presented with the set of target        │
│ parameters.                                                     │
│ 540                                                             │
└─────────────────────────────────────────────────────────────────┘
```

PREDICTING PERFORMANCE OF CONTENT ITEM CAMPAIGNS

BACKGROUND

An online system receives a request from a content item publisher to run a content item campaign. The request may include campaign parameters such as a target reach, targeting criteria, audience size, and a budget for the content item campaign. Based on a simulation of the content item campaign using the received campaign parameters, the online system may predict performance of the content item campaign to provide a quote of the price to run the content item campaign.

The online system may predict performance of the content item campaign using machine learning models to determine estimated user interaction based on the received campaign parameters such as the target reach and impression and the budget specified by the content item publisher. Based in part on the estimated performance, a quote for running the content item campaign on the online system is delivered to the content item publisher.

However, the content item publisher typically cannot compare the performance of the content item campaign to the performance of similar content item campaigns created by other content item publishers (hereafter called comparison campaigns) to evaluate whether the expected performance is effective.

SUMMARY

This invention relates generally to campaign performance predictions, and more specifically to comparing predicted performance of a content item campaign to predicted performances of comparison campaigns. An online system predicts a performance of a content item campaign based on a set of received test campaign parameters from a content item publisher and compares the performance to the estimated performances of comparison content item publishers. In order to avoid running simulations for a large number of comparison campaigns, a few of the comparison content item publishers are selected and performances of the selected comparison content item publishers are predicted using the set of received test campaign parameters to show a representation of performance distribution across all the other content item publishers in the online system. Being able to see the performance of other content item publishers can provide valuable information to the content item publisher to improve the content item campaign. The information can help the content item publisher to improve the quality of the content and/or adjust the campaign parameters for better performance in the system that selects content for presentation and evaluates user response to the same.

The online system first reduces a number of relevant prior content item campaigns for selecting comparison content item publishers. The online system applies filters to remove content item campaigns that include circumstances that may not be generalizable, such as those related to small sample sizes or under specialized conditions different from the parameters that may be specified in the evaluated campaign. For example, the filters may exclude prior content item campaigns that were run in a different country, spent budget that is less than a threshold budget, were run outside of a timeframe, and the like. Once the number of relevant prior content item campaigns is reduced, the online system may modify the remaining relevant prior content item campaigns to be used in the simulations. For example, the online system may remove characteristics of the remaining prior content item campaigns except the content item publishers that created the campaigns. From the remaining prior content item campaigns, the online system selects a set of comparison content item publishers based on simulations on the remaining prior content item campaigns run with different sets of test campaign parameters. For each set of test campaign parameters, a simulation is performed for each of the content item publishers associated with the remaining prior content item campaigns, and the content item publishers are assigned to bins based on histograms representing the simulation results. After performing all the simulations, for each of the content item publishers, the trend in bin position assignment is analyzed to identify content item publishers that are relatively stable in performance even under the variety of campaign parameter settings. In one example, when the difference in maximum and minimum bin position for a given content item publisher is less than or equal to one, the content item publisher has stable performance and stays in the same bin or adjacent bin even though campaign parameters are varied.

For each bin, a comparison content item publisher is selected to be included in the set of comparison content item publishers. The online system performs a simulation for each comparison content item publisher using the received campaign parameters from the content item publisher. This method allows the online system to run a simulation once for each bin (e.g., 10 additional simulations) instead of running hundreds of simulations for prior content item publishers. The results of the simulations can be presented to the content item publisher so that the content item publisher can compare the performance of its content item campaign to the performances of other content item publishers.

BRIEF DESCRIPTION OF THE DRAWINGS

FIG. 3 is a chart that shows performance of prior content item campaigns based on sets of test campaign parameters, in accordance with an embodiment of the invention.

FIG. 5 is a flowchart illustrating a process of generating estimated campaign presentation results of a content item campaign and comparison campaigns, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
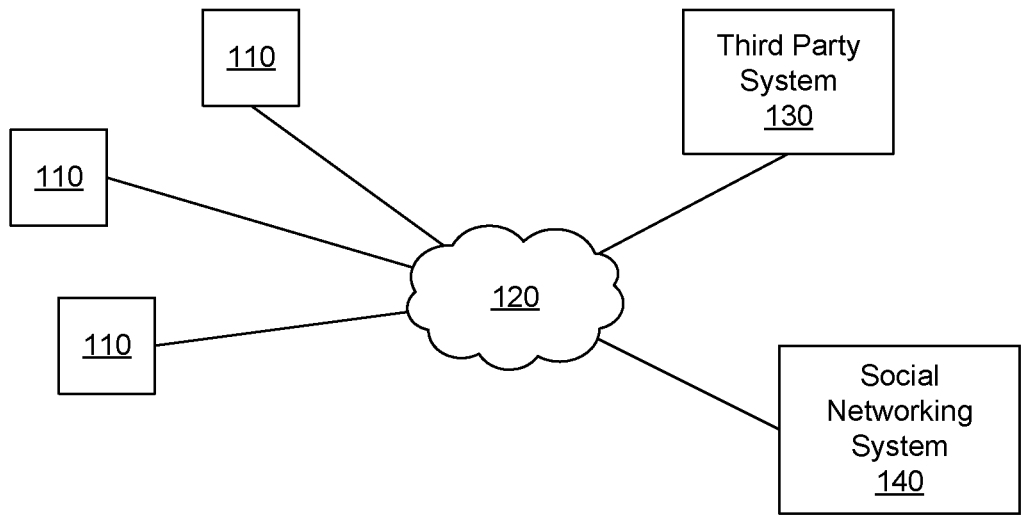
FIG. 1 is a block diagram of a system environment in which a social networking system operates, in accordance with an embodiment of the invention.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

A content item publisher such as a third party system 130 sends a request to the social networking system 140 to run a content item campaign. The request to run the content item campaign may specify target parameters such as target reach, targeting criteria, audience size, and budget for the content item campaign. The social networking system 140 predicts performance of the content item campaign and provides a quote of the price to run the content item campaign based on the specified campaign parameters and the budget. In some embodiments, the content item of the content item campaign is a video, and the social networking system 140 may predict performance in terms of view-through rate (VTR), cost-per-view (CPV), or other values that may indicate user interaction with the content item for the given budget.

In addition to the predicted performance of the content item campaign, the social networking system 140 may present an estimated performance of a set of content item publishers if applied with the received target parameters and budget of the content item campaign request. The set of content item publishers is selected from prior content item campaigns managed by the social networking system 140. After reducing a number of prior content item campaigns by applying filters to exclude the irrelevant prior content item campaigns, estimated campaign presentation results may be determined for the content item publishers associated with remaining prior content item campaigns. A simulation may be performed for the content item publishers using sets of test campaign parameters. The set of comparison content item publishers to represent a variety of content item publishers is selected based on consistent performance of the content item publishers when applied with different sets of test campaign parameters.

After comparing the estimated performance of the content item campaign to the performances of the comparison content item publishers, the content item publisher may decide to run the content item campaign as originally planned if the content item campaign is predicted to perform better than the comparison content item publishers. However, if the content item campaign is predicted to perform not as well as the comparison content item publishers, the content item publisher may decide to improve the quality of the content item or adjust the campaign parameters for better performance. Based on the predicted performance of the content item campaign using the received target parameters and the budget, the social networking system may generate and present a quote to run the content item campaign. The social networking system 140 may also expose costs of the comparison content item publishers, which creates more transparency in how the content item publisher is charged by the social networking system 140 for the content item campaign.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
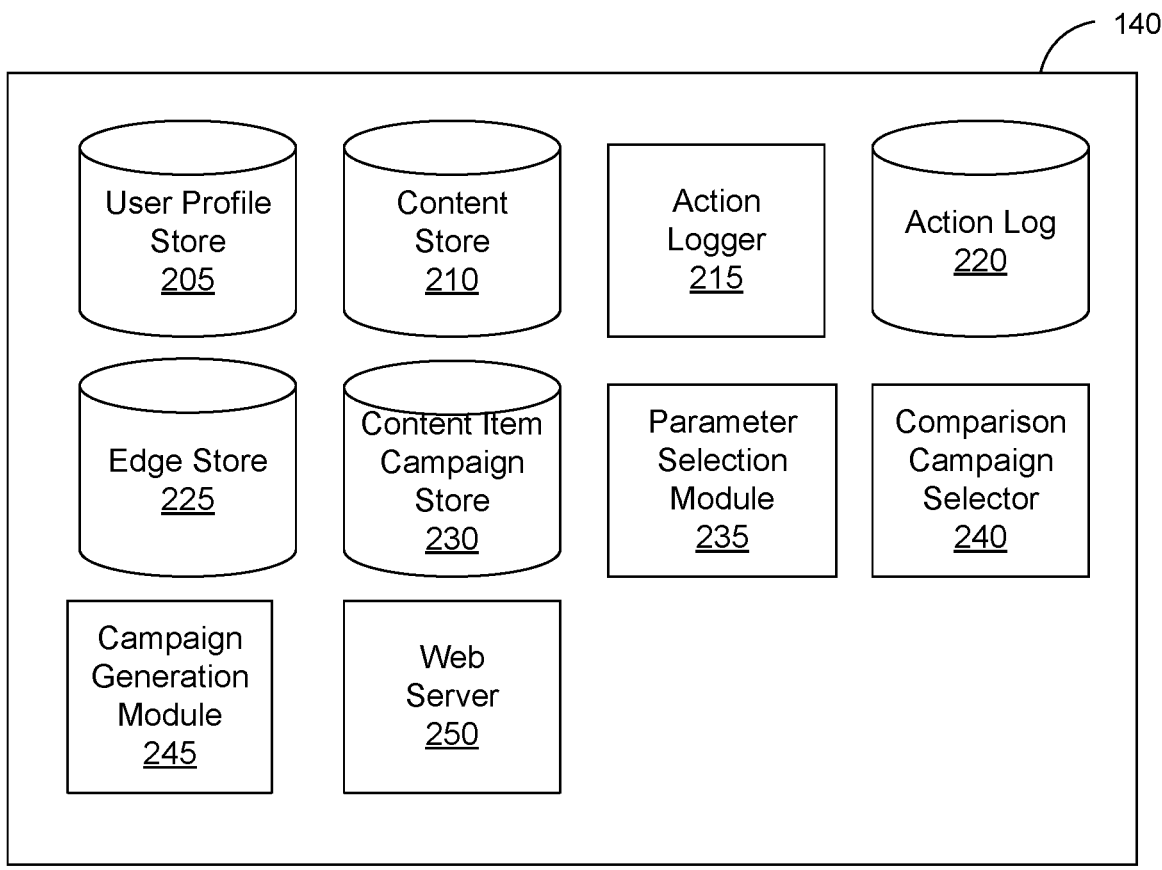
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, a content item campaign store 230, a parameter selection module 235, a comparison campaign selector 240, a campaign generation module 245, and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content item campaign store 230 stores content item campaigns that were previously run by the social networking system 140. For each prior content item campaign, the content item campaign store 230 may store information associated with the content item campaign such as content item, content item publisher, delivery parameters, delivery budget, and performance of the content item campaign. In some embodiments, the content item campaign store 230 may only store prior content item campaigns that were run within a threshold time and remove prior content item campaigns that were run more than the threshold time prior (e.g., more than 6 months ago).

The parameter selection module 235 generates sets of test campaign parameters to be used by the comparison campaign selector 240 to select a variety of comparison campaigns based on the sets of test campaign parameters. To select a variety of comparison campaigns, the parameter selection module 235 varies the sets of test campaign parameters such that each set of test campaign parameters describe a different combination of parameters and do not intersect. The test campaign parameters may be associated with user demographics information such as age, gender, relationship status, education, and workplace, user location information such as hometown, check-in information, and frequently visited locations, and user behavior information such as purchase behavior, device usage, browsing history, and activities on the social networking system 140. The test campaign parameters may also include budget, length of campaign, and type of user interaction.

The comparison campaign selector 240 selects a set of comparison campaigns from the prior content item campaigns stored by the content item campaign store 230. The comparison campaign selector 240 applies a plurality of filters to reduce the number of prior content item campaigns eligible to be included in the set of comparison campaigns. The filters allow the social networking system 140 to save time and resources by excluding the prior content item campaigns that are not relevant to the content item campaign request from the third party system 130 before running simulations. The comparison campaign selector 240 may remove prior content item campaigns that have narrow audiences. If a prior content item campaign is related to a content item that is only relevant to a small population, the prior content item campaign may not be an appropriate comparison measure. The comparison campaign selector 240 may remove prior content item campaigns that target specific users (e.g., small group of users that live in a particular location) or were targeted to users based on similarity to a set of specific users (e.g., to target users who have characteristics that "look like" those users). Although prior content item campaigns that target specific users may add variety in the set of comparison campaigns, in some embodiments these prior content item campaigns are not included in the set of comparison campaigns due to the user-based selection of the target audience, which may be narrow or may not generalize well to another audience.

The comparison campaign selector 240 may also remove campaigns with insufficient sample size, or remove a prior content item campaign if the reach and/or frequency of the prior content item campaign is less than a threshold. In one embodiment, a reach ratio may be computed for the prior content item campaign by dividing the reach (e.g., the number of users that interact with the prior content item campaign) by the number of users in the target audience for the content item campaign. In some examples, the comparison campaign selector 240 may remove prior content item campaigns if they are not recent. For example, the comparison campaign selector 240 may determine when the prior content item campaign was run, and remove the prior content item campaign if run more than a threshold time away (e.g., more than 6 months). In some embodiments, a total value of the prior content item campaign may be determined based on characteristics of the prior content item campaign, and the prior content item campaign may be filtered to be excluded from the set of comparison campaigns if the total value is less than a threshold.

After filtering for relevant prior content item campaigns, the comparison campaign selector 240 further selects a number of prior content item campaigns (e.g., 10 prior content item campaigns) to be included in the set of comparison campaigns. To select the comparison campaigns, the comparison campaign selector 240 receives sets of test campaign parameters from the parameter selection module 235, and for each set of test campaign parameters, the comparison campaign selection 240 performs a plurality of simulations. In some embodiments, characteristics of the prior content item campaigns used in the simulation are removed except for the content item publishers associated with the prior content item campaigns used in the simulation. In other embodiments, additional characteristics such as an image or video associated with the content item, delivery parameters, delivery budget of the content item campaign of the prior content item campaigns used in the simulation may be included for the simulations. After performing the simulations, the comparison campaign selector 240 determines a score for each set of test campaign parameters and prior content item campaign pair. The score represents estimated campaign presentation results of the prior content item campaign, if the prior content item campaign were run with a given set of test campaign parameters. Using the score, the performances of the prior content item campaigns are ordered or ranked for a given set of campaign parameters for various content campaigns. The scores may then be binned according to score percentile in the order to generate a histogram for that set of campaign parameters.

In one example, scores may range from 1 to 100, and the scores of the prior content item campaigns may be used to determine score percentiles that show relative performances of the prior content item campaigns. The score percentiles may then be used for binning the prior content item campaigns into a predetermined number of bins (e.g., 10 bins). For example, the prior content item campaigns in the 90$^{th}$ percentile (or top 10$^{th}$ percentile) may correspond to scores within a range of 82 and 100. These prior content item campaigns that lie in the 90$^{th}$ percentile may be assigned to bin 1. Likewise, the prior content item campaigns in the 80$^{th}$ percentile through 89$^{th}$ percentile (or the next 10$^{th}$ percentile following the top 10$^{th}$ percentile) may correspond to the scores within the range of 73 and 81, and the prior content item campaigns that lie in the 80$^{th}$ through 89$^{th}$ percentile may be assigned to bin 2.

For each prior content item, the comparison campaign selector 240 identifies a change in the histogram across the different sets of test campaign parameters. The comparison campaign selector 240 identifies a subset of the prior content items that are stable in the histogram positions after being applied with different sets of test campaign parameters. A campaign may be determined as stable when its position in the histogram bins does not vary significantly within histogram bins across different simulated campaign parameters. For example, a content item campaign that is primarily within a fourth histogram bin (e.g., fortieth percentile) but occasionally is in the fifth histogram bin. In this example, a content item campaign may be determined as stable when its position in histogram bins across various campaign parameters is distributed such that the difference between the maximum and the minimum histogram bin position across different simulated campaign parameters is less than or equal to one. In some embodiments, an average histogram bin position may be determined for each of the stable content item campaigns, and each of the stable content item campaigns may be assigned to a single histogram bin based on the average histogram bin position. For example, if the average histogram bin position of a stable content item campaign is 4.2, the stable content item campaign may be included as a candidate for the fourth histogram bin since 4.2 is closer to four than five. In other embodiments, the stable content item campaigns may be a candidate for both the fourth histogram bin and the fifth histogram bin. To select a variety of comparison content item publishers with various types of performance, the set of comparison content item publishers may include at least one content item publisher associated with a candidate from each of the bins.

In some embodiments, the constraint on difference between the maximum and minimum histogram bin position may be relaxed to less than or equal to two for a prior content item campaign to be determined as stable. For example, a prior content item campaign may be in the seventh, eighth, and ninth histogram bins across different simulated campaign parameters. Since the difference between the maximum histogram bin position (e.g., nine) and the minimum histogram bin position (e.g., seven) is less than or equal to two, the prior content item campaign is determined to be stable. In some embodiments, the prior content item campaign may be assigned to be a candidate for a single histogram bin based on an average histogram bin position. In other embodiments, the prior content item campaign may be assigned to be a candidate for the seventh, eighth, and ninth histogram bins.

After identifying stable prior content item campaigns and assigning the stable prior content item campaigns to be candidates for histogram bins, one prior content item campaign is selected from each of the histogram bins to represent the histogram bin. The content item publishers associated with these prior content item campaigns are selected to be included in the set of comparison content item publishers for simulations. Since each comparison content item publisher is from a different histogram bin, there is variety in content item publishers. However, when a prior content item campaign is a candidate for multiple histogram bins, the same comparison content item publisher may be selected for multiple histogram bins, reducing the variety in the set of comparison content item publishers. To lower the likelihood of selecting the same content item publisher in neighboring histogram bins, the set of comparison content item publishers may be selected by minimizing a sum of pairwise correlation between content item publishers in neighboring bins. The pairwise correlation may be determined between each pair of content item publishers in neighboring bins (e.g., first and second bins, second and third bins, third and fourth bins . . . ) using the score of prior content item campaign that was used for binning. The correlation between a content item publisher in a histogram bin and the same content item publisher in a neighboring bin is a maximum value because they are identical. Therefore, the likelihood of selecting the same content item publisher is lower when minimizing the sum of pairwise correlation. The minimizing process may be performed by using a shortest path algorithm.

The campaign generation module 245 receives a request from a third party system 130 to run a content item campaign, the request including target parameters specified by the third party system 130. The campaign generation module 245 performs a simulation to estimate a performance of the received content item campaign given the target parameters specified in the request. The target parameters may include budget, length of content item campaign, desired channel of presentation, desired interaction from users, and targeting criteria for the users. Based on the target parameters, the campaign generation module 245 estimates the performance of the received content item campaign. In some embodiments, the associated content item of the content item campaign is a video, and the campaign generation module 245 determines an estimated interaction rate of users of the social networking system 140 and the third party system 130 based on the third party's target parameters. The estimated interaction rate of users may be in terms of view-through rate (VTR), and the campaign generation module 245 may estimate a percentage of a target audience that is expected to watch the video for more than a threshold time (e.g., 15 seconds or any other suitable time period). The estimate interaction rate of users may be in terms of cost-per-view (CPV), and the campaign generation module 245 may determine an estimated cost that the third party system 130 is expected to spend per view from a user of the target audience.

In some embodiments, based on the request received from the third party system 130, the prior content items that are considered in, or selected by, the comparison campaign selector 240 to be included the set of comparison campaign is filtered further. For example, if the content item campaign request is for a video, the comparison campaign selector 240 may exclude prior content item campaigns that are associated with content items that are not videos. As another example, the comparison campaign selector 240 may also remove content item campaigns that are not run in the same country as the country specified in the content item campaign request received.

In some embodiments, the campaign generation module 245 uses a machine learning algorithm to determine the estimated interaction rate of the content item campaign. The machine learning algorithm could be trained using a training set that includes at least a set of prior content items from the content item campaign store 230. The set of prior content items used in the training set may include prior content item campaigns that were run by the third party system 130 such that the estimated interaction rate is based on historical performances of the third party system 130. In some embodiments, if the third party system 130 that requests the content item campaign does not have sufficient number of prior content items to be used in the training set, the campaign generation module 245 may select prior content item campaigns of other third party systems 130 that are similar to the third party system 130 that requests the content item campaign. The campaign generation module 245 may compare characteristics such as targeting criteria, budget, reach, and frequency and select prior content items run by other third party systems 130 that are similar to the prior content item request from the content item campaign store.

The web server 250 links the social networking system 140 via the network 120 to the one or more client devices 110, as well as to the one or more third party systems 130. The web server 250 serves web pages, as well as other web-related content, such as JAVA®, FLASH®, XML and so forth. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or RIM®.

FIG. 3 is a chart that shows performance of prior content item campaigns based on sets of test campaign parameters, in accordance with an embodiment of the invention. The chart displays results of performances of prior content item campaigns when applied with different sets of test campaign parameters. The different sets of test campaign parameters may include parameters such as audience targeting criteria, budget, bid amount, target reach, and target frequency. Because the social networking system 140 manages a large number of content item campaigns, it is not efficient to run a simulation to determine a predicted performance for each of the prior content item campaigns managed by the social networking system 140. After reducing a number of prior content item campaigns using filters based in part on characteristics of a content item publisher and the campaign parameters specified by the content item publisher, a set of test content item campaigns are selected based on the predicted performance of the remaining prior content item campaigns that are run with the sets of test campaign parameters.

In the example shown in FIG. 3, each of the prior content item campaigns C1 through C6 is evaluated using sets of test campaign parameters P1 through P4. In some embodiments, the sets of test campaign parameters P1 through P4 are selected such that they do not specify the same campaign parameters. The prior content item campaigns C1 through C6 are prior content item campaigns that are determined to be relevant after applying a plurality of filters to remove prior content item campaigns that are not relevant. For each prior content item campaign C1 through C6, a simulation is performed for each of the sets of test campaign parameters P1 through P4. Before being used in the simulation, characteristics of each prior content item campaign C1 through C6 may be removed. In some embodiments, only content item publisher information associated with each prior content item campaigns is used in the simulation. In other embodiments, different combinations of additional characteristics such as content item publisher, content item, delivery parameters, and delivery budget associated with each prior content item campaign are used in the simulation.

When simulation is performed for prior content item campaign C1 using test campaign parameters P1, a score of 20 is generated. The score represents an estimated campaign presentation result of the prior content item campaign C1 when test campaign parameters P1 is applied. Based on the score, the campaign is assigned to a bin in a histogram. In some embodiments, the score corresponds to a percentile of the campaign performance compared to other prior content item campaigns, and the percentile may be used to determine the bin of the histogram that the prior content item campaign belongs to. In the example shown in FIG. 3, the histogram of prior content item campaigns are divided into 10 equal non-overlapping bins. In the example shown in FIG. 3, scores 1-10 correspond to bin 10, scores 11-20 correspond to bin 9, scores 21-30 correspond to bin 8, and so on.

For prior content item campaign C1, when applied with campaign parameters P1 through P4, the scores are 23, 30, 90, and 85, respectively. These scores correspond to bin 8, bin 7, bin 1, and bin 2, respectively. By comparing the change in bin position when applied with different campaign parameters, the performance of campaign C1 is determined to be not stable and is affected heavily by the set of test campaign parameters used. In some embodiments, the social networking system 140 may determine the difference in positions of the maximum bin and the minimum bin. In some embodiments, if the difference in position between the maximum bin and the minimum bin is greater than a threshold value such as, for example, 1, the prior content item campaign may not be included in the set of comparison campaigns. For campaign C1, the maximum bin value is 8 when applied with test campaign parameters P1 and the minimum bin value is 1 when applied with test campaign parameters P3. Since the difference between the maximum bin value and the minimum bin value is 7, campaign C1 is not selected to be included in the set of comparison campaigns.

For the prior content item campaign C2, when applied with the sets of test campaign parameters P1, P2, and P3, the scores are 50, 53, and 52, respectively. For these sets of test campaign parameters, the prior content item campaign C2 is assigned to bin 5. When applied with campaign parameters P4, the prior content item campaign C2 gets a score of 60, which corresponds to bin 4. In this case, the performance of the prior content item campaign C2 is consistent when applied with different sets of test campaign parameters, and the difference between the maximum bin position and the minimum bin position is one. Because the difference between the maximum bin position and the minimum bin position is one, the prior content item campaign C2 performance is determined to be stable and is included in the set of comparison campaigns.

The prior content item campaign C3 has a difference between maximum bin position and minimum bin position of 5, the prior content item campaign C4 has a difference of 0, the prior content item campaign has a difference of 1, the prior content item campaign C5 has a difference of 1, and the prior content item campaign C6 has a difference of 5. The prior content item campaigns C3 and C6 are excluded from the set of comparison campaigns because the difference is greater than 1, and the prior content item campaigns C4 and C5 are included in the set of comparison campaigns because the difference is less than or equal to 1.

In some embodiments, an average bin position is determined for the prior content item campaigns that have a difference in bin position of less than or equal to one. The set of comparison campaigns may be selected using the average bin positions. The set of comparison campaigns may include one representative prior content item from each bin based on the average bin positions.

In some embodiments, the simulations to select the set of comparison campaigns from the prior content item campaigns may be performed in batches to minimize time and computing resources spent on performing simulations. Instead of running simulations for all of the eligible prior content item campaigns at once, the comparison campaign selector 240 may perform simulations for a first subset of the prior content item campaigns. If there are prior content items from each bin that satisfy the requirements to be included in the set of test campaign parameters, the comparison campaign selector 240 stops performing simulations of the prior content item campaigns. However, if the prior content item campaigns from the first subset of the prior content item campaigns do not include a representative prior content item for each bin of the histogram, the comparison campaign selector 240 may perform simulations for a second subset of the prior content item campaigns of additional prior content items. The comparison campaign selector 240 may perform simulations of subset of prior content items until the set of test content items includes a prior content item from each bin position.

Figure 4:
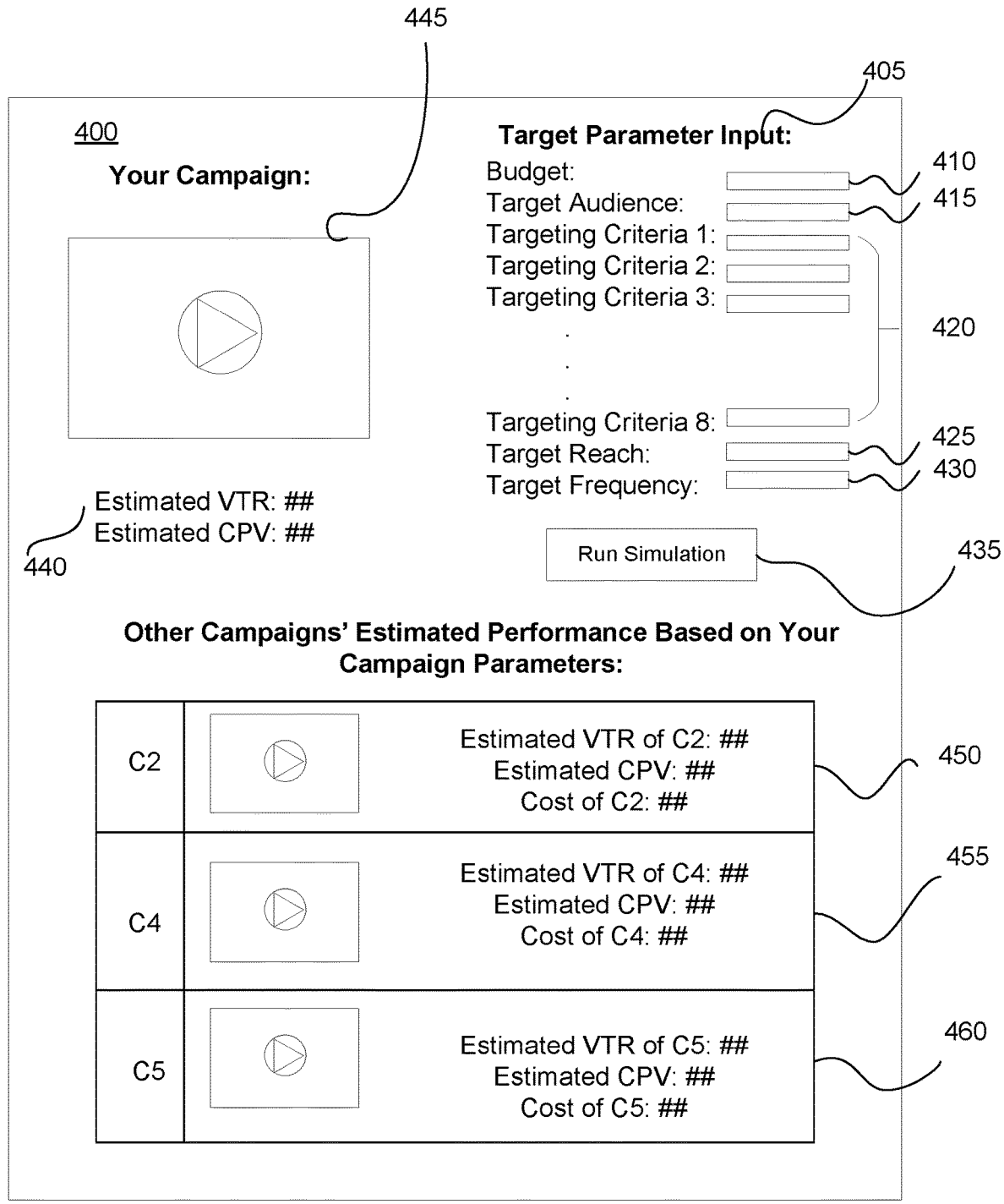
FIG. 4 is an example user interface that shows performance results of a content item campaign and comparison campaigns, in accordance with an embodiment of the invention.

FIG. 4 is an example user interface that shows performance results of a content item campaign and comparison campaigns, in accordance with an embodiment of the invention, in accordance with an embodiment of the invention. The graphical user interface (GUI) 400 includes a target parameter input interface 405 that receives target parameters from a content item publisher that describes the conditions for performing a simulation to determine performance of the content item campaign. In some embodiments, the user target parameters input interface 405 includes input fields for budget 410, target audience 415, targeting criteria 420, target reach 425, and target frequency 430. In other embodiments, the user target parameters input interface 405 may include additional or fewer target parameters.

A content publisher uploads a content item 445 associated with the content item campaign. After uploading the content item 445 and entering target parameters, the content publisher requests a simulation by interacting with a simulation element 435 on the GUI 400 to determine campaign presentation results 440 of the content item campaign. In some embodiments, the content item 445 is a video, and estimated content item campaign presentation results 440 is determined in terms of view-through rate (VTR) and cost-per-view (CPV).

In addition to presenting the campaign presentation results 440 of the content item campaign, the GUI 400 may also display the campaign presentation results of comparison campaigns. In the example shown in FIG. 4, estimated VTRs, CPVs, costs for comparison campaign C2 450, comparison campaign C4 455, and comparison campaign C5 460 are displayed in GUI 400. The comparison campaigns C2, C4, and C5 are selected from prior content item campaigns managed by the social networking system 140 because the estimated performances of these comparison campaigns are stable when applied with different test campaign parameters. Although not shown in FIG. 4, the GUI 400 may display estimated performances of additional comparison campaigns such that the user may view estimated performances of at least one comparison campaign from each histogram bin. In some embodiments, the GUI 400 may also show a summary of past performances of prior content item campaigns by the content item publisher to allow the content item publisher to compare the estimated performance of the present content item campaign request with historical performances.

FIG. 5 is a flowchart illustrating a process of generating estimated campaign presentation results of a content item campaign and comparison campaigns, in accordance with an embodiment of the invention. The process 500 may include different or additional steps than those described in conjunction with FIG. 5 in some embodiments or perform steps in different orders than the order described in conjunction with FIG. 5.

A social networking system identifies 505 a set of prior content item campaigns and a plurality of sets of test campaign parameters. The prior content item campaigns are content item campaigns that were run by the social networking system for different content publishers in the social networking system. For each set of test campaign parameters, the social networking system estimates 510 campaign presentation results for each prior content item campaign using the set of test campaign parameters. The plurality of sets of test campaign parameters is selected such that the sets describe different combinations of parameters and do not intersect. Since the social networking system manages a large number of prior content item campaigns, the social networking system may filter the prior content item campaigns to reduce the number of prior content item campaigns that are evaluated using the plurality of sets of test campaign parameters. The filters may exclude prior content item campaigns based on a total value of the campaign, a reach of a campaign, a type of targeting criteria, and an audience size of the campaign.

After estimating campaign presentation results for each prior content item campaign, the social networking system identifies 515 a score of the prior content item campaigns according to the estimated campaign presentation results. The social networking system generates 520 a histogram of the prior content item campaigns that assigns a bin to a prior content item campaign based on the score. The social networking system identifies 525 a change in histogram position for each prior content item campaign across the histograms. If the histogram position of a prior content item campaign does not change when applied with different sets of test campaign parameters, the prior content item campaign has stable performance. The social networking system selects 530 a set of comparison campaigns based on the change in histogram position for the prior content campaigns. In some embodiments, the social networking system selects the prior content campaigns with difference in maximum histogram position and minimum histogram position of less than a threshold.

After selecting the set of comparison campaigns, the social networking system receives 535 a set of target parameters for a content item campaign from an entity. The social networking system generates 540 a set of estimated campaign presentation results for the content item campaign presentation results of the set of comparison campaigns if presented with the set of target parameters. The social networking system may display the content item campaign presentation results of the set of comparison campaigns with the estimated performance of the content item campaign on a graphical user interface (GUI).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   identifying, by an online system, a set of prior content item campaigns presented to users of an online system;
   identifying, by the online system, a plurality of sets of test campaign parameters, each set of test campaign parameters describing a different combination of parameters for presenting content to users;
   selecting, by the online system, a set of comparison campaigns from the set of prior content item campaigns by:
      for each set of test campaign parameters in the plurality of sets of test campaign parameters:
         estimating campaign presentation results for each prior content item campaign if presented to users with the set of test campaign parameters;
         identifying a score of the prior content item campaigns according to the estimated campaign presentation results; and
         generating a histogram of the prior content item campaigns that assigns a bin to a prior content item campaign based on the score;
      identifying, by the online system, a change in histogram position for each prior content item campaign across the histograms associated with the set of test campaign parameters; and
      selecting the set of comparison campaigns based on the change in histogram position for the prior content item campaigns;
   receiving a request from an entity, by the online system, to determine an estimated campaign presentation result for a content item campaign associated with the entity, the request including a set of target parameters for the content item campaign;
   responsive to receiving the request, generating, by the online system, the estimated campaign presentation result for the content item campaign and a set of estimated campaign presentation results for the set of comparison campaigns in real-time by estimating performances of the content item campaign and the set of comparison campaigns if presented with the set of target parameters; and
   presenting the estimated campaign presentation result for the content item campaign and the set of estimated campaign presentation results for the set of comparison campaigns to the entity on a graphical user interface (GUI).

2. The method of claim 1, wherein the set of comparison campaigns are selected from the prior content item campaigns having a change in histogram position of one or less across the histograms associated with the set of test campaign parameters.

3. The method of claim 1, further comprising filtering the set of prior content item campaigns to determine a filtered set of prior content item campaigns, wherein the set of comparison campaigns is selected from the filtered set of prior content item campaigns and the prior content item campaigns are filtered to exclude content item campaigns based on a total value of the campaign, a reach of a campaign, a type of targeting criteria, and an audience size of the campaign.

4. The method of claim 1, wherein the content item campaign has a desired interaction type, and the set of prior content item campaigns excludes prior content item campaigns having a different desired interaction type.

5. The method of claim 1, wherein the set of comparison campaigns is selected from the set of prior content item campaigns to include a diversity of average histogram positions.

6. The method of claim 1, wherein the prior content item campaigns each have an associated set of delivery parameters and were presented to users according to the set of delivery parameters; and further wherein the estimated campaign presentation results for each prior content item campaign is based on the results of presenting content to users of the campaign according to the delivery parameters for the prior content item campaign.

7. The method of claim 1, wherein the estimated campaign presentation results include estimated interaction rates and are presented to the entity for comparison with a historical interaction rate for the entity based on prior content item campaigns of the entity.

8. A non-transitory computer-readable medium comprising computer program instructions that when executed by a computer processor of an online system cause the processor to perform steps comprising:
   identifying a set of prior content item campaigns presented to users of an online system;
   identifying a plurality of sets of test campaign parameters, each set of test campaign parameters describing a different combination of parameters for presenting content to users;
   selecting a set of comparison campaigns from the prior content item campaigns by:
      for each set of test campaign parameters in the set of test campaign parameters:
         estimating campaign presentation results for each prior content item campaign if presented to users with the set of test campaign parameters;
         identifying a score of the prior content item campaigns according to the estimated campaign presentation results; and
         generating a histogram of the prior content item campaigns that assigns a bin to a prior content item campaign based the score;
      identifying a change in histogram position for each prior content item campaign across the histograms associated with the set of test campaign parameters; and
      selecting the set of comparison campaigns based on the change in histogram position for the prior content item campaigns;
   receiving a request from an entity to determine an estimated campaign presentation result for a content item campaign associated with the entity, the request including a set of target parameters for the content item campaign;
   responsive to receiving the request, generating the estimated campaign presentation result for the content item campaign and a set of estimated campaign presentation results for the set of comparison campaigns in real-time by estimating performances of the content item campaign and the set of comparison campaigns if presented with the set of target parameters; and
   presenting the estimated campaign presentation result for the content item campaign and the set of estimated campaign presentation results for the set of comparison campaigns to the entity on a graphical user interface (GUI).

9. The non-transitory computer-readable medium of claim 8, wherein the set of comparison campaigns are selected from the prior content item campaigns having a change in histogram position of one or less across the histograms associated with the set of test campaign parameters.

10. The non-transitory computer-readable medium of claim 8, wherein the non-transitory computer-readable medium further comprises instructions that when executed by a computer processor of an online system cause the processor to determine a filtered set of prior content item campaigns, wherein the set of comparison campaigns is selected from the filtered set of prior content item campaigns and the prior content item campaigns are filtered to exclude content item campaigns based on a total value of the campaign, a reach of a campaign, a type of targeting criteria, and an audience size of the campaign.

11. The non-transitory computer-readable medium of claim 8, wherein the subject campaign has a desired interaction type, and the set of prior content item campaigns excludes prior content item campaigns having a different desired interaction type.

12. The non-transitory computer-readable medium of claim 8, wherein the set of comparison campaigns is selected from the set of prior content item campaigns to include a diversity of average histogram positions.

13. The non-transitory computer-readable medium of claim 8, wherein the prior content item campaigns each have an associated set of delivery parameters and were presented to users according to the set of delivery parameters; and further wherein the estimated campaign presentation results for each prior content item campaign is based on the results of presenting content to users of the campaign according to the delivery parameters for the prior content item campaign.

14. The non-transitory computer-readable medium of claim 8, wherein the estimated campaign presentation results include estimated interaction rates and are presented to the entity for comparison with a historical interaction rate for the entity.

15. A system comprising:
   a processor; and
   a non-transitory computer-readable medium comprising computer program instructions that when executed by the processor of an online system causes the processor to perform steps comprising:
      identifying a set of prior content item campaigns presented to users of an online system;
      identifying a plurality of sets of test campaign parameters, each set of test campaign parameters describing a different combination of parameters for presenting content to users;
      selecting a set of comparison campaigns from the prior content item campaigns by:
         for each set of test campaign parameters in the set of test campaign parameters:
            estimating campaign presentation results for each prior content item campaign if presented to users with the set of test campaign parameters;
            identifying a score of the prior content item campaigns according to the estimated campaign presentation results; and
            generating a histogram of the prior content item campaigns that assigns a bin to a prior content item campaign based the score;
         identifying a change in histogram position for each prior content item campaign across the histograms associated with the set of test campaign parameters; and
         selecting the set of comparison campaigns based on the change in histogram position for the prior content item campaigns;
      receiving a request from an entity to determine an estimated campaign presentation result for a content item campaign associated with the entity, the request including a set of target parameters for the content item campaign;

responsive to receiving the request, generating the estimated campaign presentation result for the content item campaign and a set of estimated campaign presentation results for the set of comparison campaigns in real-time by estimating performances of the content item campaign and the set of comparison campaigns if presented with the set of target parameters; and presenting the estimated campaign presentation result for the content item campaign and the set of estimated campaign presentation results for the set of comparison campaigns to the entity on a graphical user interface (GUI).

16. The system of claim 15, wherein the set of comparison campaigns are selected from the prior content item campaigns having a change in histogram position of one or less across the histograms associated with the set of test campaign parameters.

17. The system of claim 15, wherein the non-transitory computer-readable medium comprises computer program instructions that when executed by the processor of the online system causes the processor to perform steps further comprising:

filtering the set of prior content item campaigns to determine a filtered set of prior content item campaigns, wherein the set of comparison campaigns is selected from the filtered set of prior content item campaigns and the prior content item campaigns are filtered to exclude content item campaigns based on a total value of the campaign, a reach of a campaign, a type of targeting criteria, and an audience size of the campaign.

18. The system of claim 15 wherein the set of comparison campaigns are selected from the prior content item campaigns having a change in histogram position of one or less across the histogram associated with the set of test campaign parameters.

19. The system of claim 15, wherein the non-transitory computer-readable medium comprises computer program instructions that when executed by the processor of the online system causes the processor to perform steps further comprising:

filtering the set of prior content item campaigns to determine a filtered set of prior content item campaigns, wherein the set of comparison campaigns is selected from the filtered set of prior content item campaigns and the prior content item campaigns are filtered to exclude content item campaigns based on a total value of the campaign, a reach of a campaign, a type of targeting criteria, and an audience size of the campaign.

20. The system of claim 15, wherein the content item campaign has a desired interaction type, and the set of prior content item campaigns exclude prior content item campaigns having a different desired interaction type.

* * * * *

UNITED STATES PATENT AND TRADEMARK OFFICE
CERTIFICATE OF CORRECTION

PATENT NO. : 10,839,418 B1
APPLICATION NO. : 16/200606
DATED : November 17, 2020
INVENTOR(S) : Prathyusha Aragonda et al.

Page 1 of 1

It is certified that error appears in the above-identified patent and that said Letters Patent is hereby corrected as shown below:

In the Claims

Column 17, Line 36, Claim 8, delete "to a prior content item campaign based the score;" and insert -- to a prior content item campaign based on the score; --.

Column 18, Line 58, Claim 15, delete "to a prior content item campaign based the score;" insert -- to a prior content item campaign based on the score; --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*